United States Patent [19]

Nelson

[11] Patent Number: 4,626,697
[45] Date of Patent: Dec. 2, 1986

[54] POWER SUPPLY FOR PROVIDING PLURAL DC VOLTAGES

[75] Inventor: David C. Nelson, Santa Ana, Calif.

[73] Assignee: American Hospital Supply Corporation, Evanston, Ill.

[21] Appl. No.: 663,673

[22] Filed: Oct. 22, 1984

[51] Int. Cl.[4] ............................................. H02J 1/10
[52] U.S. Cl. .......................................... 307/18; 307/28; 307/43; 307/17; 363/126; 363/60
[58] Field of Search ............... 307/18, 11, 17, 12, 307/24, 28, 31, 32, 33, 34, 35, 43, 50, 51, 58, 64, 66, 75, 82; 323/266, 265, 273, 282; 363/17, 52, 59, 86, 87, 88, 60, 61, 125, 126, 67, 89; 320/32–40, 46, 49

[56] References Cited

U.S. PATENT DOCUMENTS

| | | | |
|---|---|---|---|
| 3,132,309 | 5/1964 | Constable | 307/17 |
| 3,205,426 | 9/1965 | Mills | 363/88 X |
| 3,243,683 | 3/1966 | Ackley | 363/60 X |
| 3,356,926 | 12/1967 | Mason et al. | 363/61 |
| 3,493,840 | 2/1970 | Rosenberg | 363/61 |
| 3,525,921 | 8/1970 | Wattson | 363/86 |
| 3,699,352 | 10/1972 | Silver | 307/43 X |
| 3,731,179 | 5/1973 | Rademaker | 363/60 |
| 3,921,053 | 11/1975 | Hekimian | 363/126 X |
| 4,055,790 | 10/1977 | Gerding et al. | 307/31 X |
| 4,144,463 | 3/1979 | Sugiura | 307/24 X |
| 4,219,872 | 8/1980 | Engelmann | 363/126 |
| 4,355,884 | 10/1982 | Honda et al. | 307/17 X |
| 4,398,120 | 8/1983 | Guillon | 363/59 X |
| 4,471,423 | 9/1984 | Hase | 363/126 X |

FOREIGN PATENT DOCUMENTS 0686311   5/1964   Canada ............................. 363/61

Primary Examiner—William M. Shoop, Jr.
Assistant Examiner—Shik Luen Paul Ip
Attorney, Agent, or Firm—Perman & Green

[57] ABSTRACT

A DC power supply capable of providing a number of output voltages, including a balanced positive and negative voltage supply for integrated circuit applications, includes a transformer having primary and secondary windings. A diode bridge rectifier circuit is connected across the secondary winding end terminals for providing a DC output voltage of one polarity with respect to ground. Another DC output voltage of opposite polarity is developed by AC coupling a voltage multiplier circuit between one of the secondary winding terminals and ground. DC regulator circuits are included for regulation of the DC output voltages under load conditions.

7 Claims, 2 Drawing Figures

POWER SUPPLY FOR PROVIDING PLURAL DC VOLTAGES

BACKGROUND OF THE INVENTION

The present invention relates generally to DC power supplies and, more particularly, to a power supply which provides a number of DC voltages of different levels, including a positive/negative balanced output for integrated circuit applications through the use of a transformer having a minimal number of secondary winding terminals.

Present day electronic equipment particularly solid state devices for carrying out a multitude of signal processing and control operations, typically require power supplies capable of providing more than one DC supply voltage for various loads, including the devices themselves, to be energized by the equipment. In equipment which carries out small signal amplification and processing in one area, and provides means for driving a relatively large power consuming device (e.g., a printer) in another area, a power supply capable of providing a balanced DC output of; for example, plus and minus 12 volts to a number of differential amplifiers, +5 volts to other amplifiers and processing stages, and +24 volts to large signal and power driver stages, must be provided.

It will also be understood that a balanced (plus and minus DC) voltage supply, namely, a supply which delivers two voltages of equal magnitude but of opposite sign, is required in equipment capable of receiving and/or transmitting digital data from or to other data processing equipment wherein the value of the bits of data handled by such equipment ("0" or "1") corresponds to the polarity of the bit signals; e.g., RS-232C interface applications.

The known prior power supplies in electronic equipment of the above kind which require multiple levels of DC supply voltages, require either a number of separate power transformers each corresponding to a different one of the supply voltages, or a power transformer having numerous secondary windings and/or taps each of which is connected to an associated rectifier/filter stage for supplying one of the required DC supply voltages in the equipment. Since each of the transformers has to withstand certain minimum load current demands at the associated supply voltage, it is relatively costly to provide multiple power transformers each of sufficient current handling capability, or even a single high-power rated transformer with multiple secondary winding taps.

Much of the cost incurred in the latter case; i.e., a multi-tapped secondary winding, is due to the fact that custom transformer design is ordinarily called for to ensure that the taps are connected to the secondary winding at such locations as to enable the various rectifier/filter and regulator stages in the power supply to maintain the DC supply voltages constant under load.

SUMMARY OF THE INVENTION

The present invention overcomes the above and other shortcomings in the known power supplies. The invention provides a power supply in which one transformer is used to enable a number of different supply voltages to be obtained. The power supply is capable of providing a number of different DC supply voltages, including a balanced, positive/negative voltage supply.

According to the present invention, a DC power supply arrangement comprises a transformer including primary winding means for connection to an AC voltage source and secondary winding means coupled to the primary winding means. First and second terminal means are connected across at least a portion of the secondary winding means to provide an AC secondary voltage when the primary winding means is connected to the AC source. First rectifier means is connected to the first and the second terminal means to produce a first DC voltage of one polarity with respect to a common potential point in response to the AC secondary voltage induced at the first and the second terminal means, the first rectifier means including a diode circuit arranged so that the AC secondary voltage present on at least one of the first and the second terminal means, is applied to the common potential point during a half cycle period. Second rectifier means is connected between one of the first and the second terminal means and the common potential point, to produce a second DC voltage of polarity opposite to that produced by the first rectifier means with respect to the common potential point.

The various features of novelty which characterize the invention are pointed out with particularity in the claims annexed to and forming a part of this disclosure.

BRIEF DESCRIPTION OF THE DRAWING

For a better understanding of the invention, its operating advantages and specific objects attained by its use, reference should be had to the accompanying drawing and descriptive matter in which there is illustrated and described a preferred embodiment of the invention wherein.

DESCRIPTION OF THE INVENTION

Figure 1:
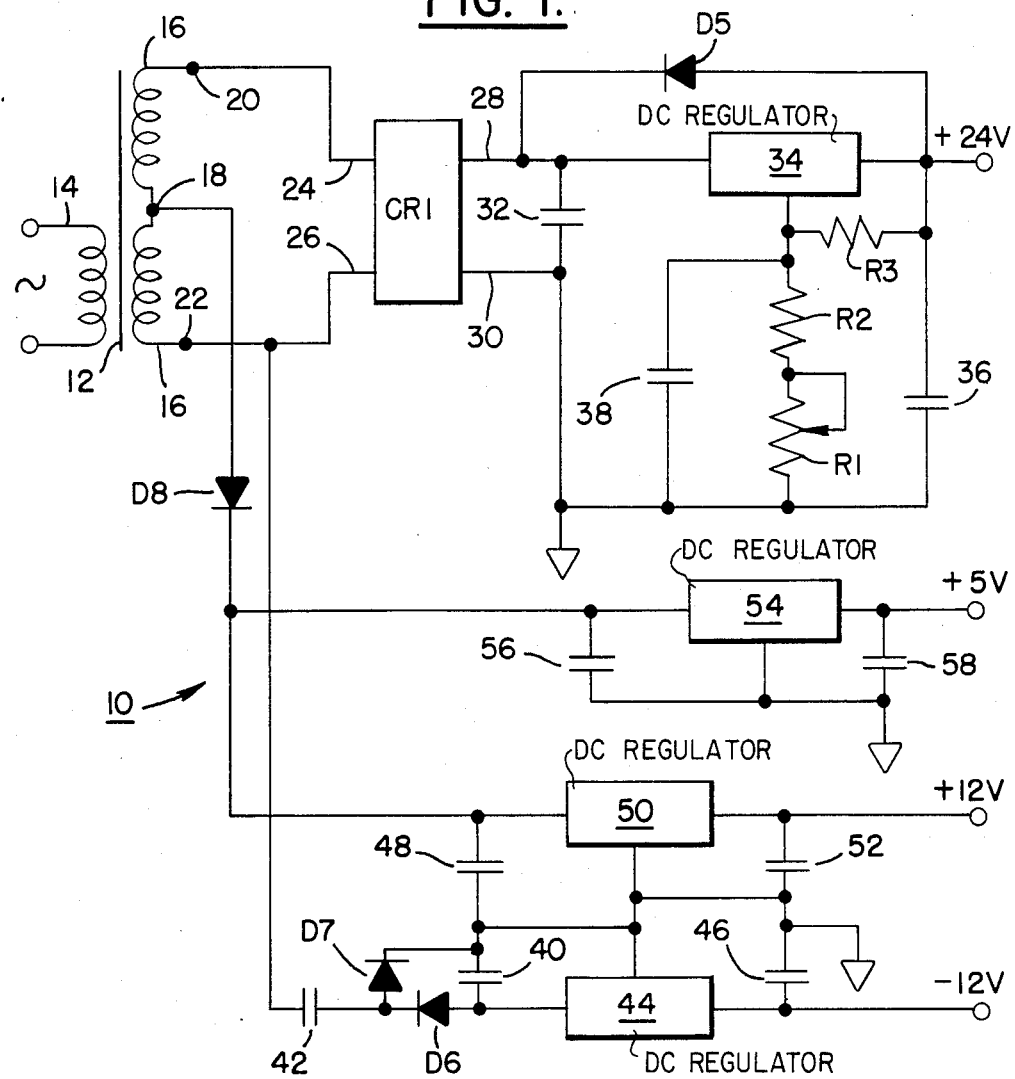
FIG. 1 is an electrical schematic diagram illustrating a DC power supply arrangement according to the invention.

FIG. 1 shows a DC power supply 10 for providing output voltages of different levels as well as a balanced (plus and minus) DC output voltage, according to the invention.

The power supply 10 includes a transformer 12 having a primary winding 14, and a secondary winding 16 in electromagnetic coupling relation with the primary winding 14. The secondary winding 16 has a center-tap terminal 18 connected to the center of the secondary winding 16, and a pair of winding end terminals 20, 22 each connected to a different end of the secondary winding 16.

In accordance with the invention, transformer 12 may be of a conventional type, including one which has two or more existing secondary windings. For example, the transformer 12 may be a kind having dual 12 volt AC secondary windings with an end terminal of one secondary winding connected in phase adding relation to a terminal of the other secondary winding so that the connected terminals form the center-tap terminal 18. The resulting AC voltage induced across the entire secondary winding 16 thus would be 24 volts AC.

Figure 2:
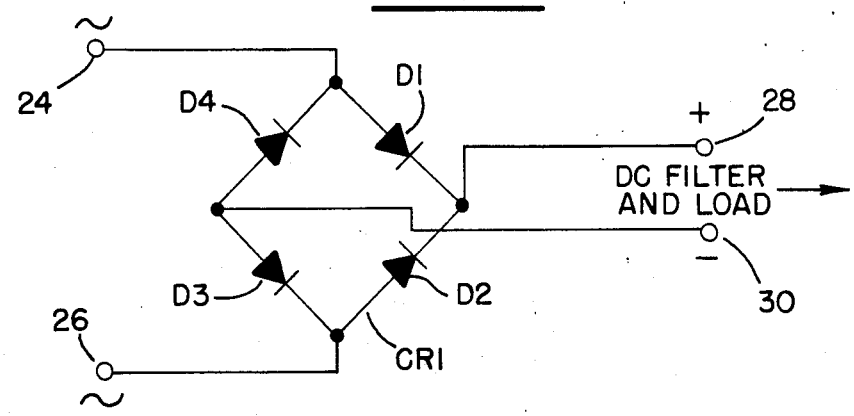
FIG. 2 is an electrical schematic diagram of a diode bridge in the power supply arrangement of FIG. 1.

The secondary winding end terminals 20, 22 are connected to a rectifier CR1 at rectifier inputs 24, 26 as shown in FIG. 1. Rectifier CR1 includes a diode bridge which, as shown in FIG. 2, is formed of diodes D1–D4 arranged to provide full-wave rectification of the secondary winding AC voltage appearing at terminals 24, 26. Accordingly, during each half cycle of the AC voltage input at terminals 24, 26 when the potential at terminal 24 is greater than that at terminal 26, diodes D1 and D3 are conductive to a DC filter capacitor 32 and load connected across output terminals 28, 30, and a positive DC potential is created at terminal 28 with respect to terminal 30. During the half of the AC cycle when input terminal 26 is at greater potential than that of input terminal 24, diodes D2 and D4 are conductive so as to permit a uni-directional flow of DC output current, as in the other half of the AC cycle, from output terminal 28 through the load and back to terminal 30.

It will be understood that when the rectifier CR1 in FIGS. 1 and 2 is operative, one of the terminals 24, 26 is coupled to the rectifier output terminal 30 by a corresponding one of the diodes D3 and D4 during the half cycle in which the one terminal potential is less than one of the other terminal. The terminal 30 is connected to a common potential point (ground potential) in the present power supply 10.

As shown in FIG. 1, the output terminals 28, 30 of rectifier CR1 are connected across filter capacitor 32, a typical value for which may be; e.g., 4200 uF. The positive output terminal 28 is also connected to an input terminal of a DC voltage regulator circuit 34 which may be, for example, device type LM317T. An output filter capacitor 36 (e.g., 4.2 uF) is connected between the output terminal of regulator circuit 34 and ground potential, and a protective diode D5 is connected between the output and the input of regulator circuit 34.

To enable fine adjustment of the regulator DC output voltage to, for example, +24 volts, bias circuitry in the form of resistors R1, R2, and R3 is provided as shown in FIG. 1. Resistor R1 is a trimming resistor having a typical value of 1000 ohms, and is connected in series with resistor R2 which is of high tolerance (1%) and of typical value of 4.02 K ohms. The series circuit of resistors R1, R2 is connected between a reference terminal of regulator circuit 34 and ground. Another filter capacitor 38 (4.2 uF) is connected across the series resistors R1, R2. A third bias resistor R3 (237 ohms) is connected between the output and the reference terminals of DC regulator circuit 34.

Actually, the values of resistors R1, R2, and R3 are determined by the required output voltage from the regulator circuit 34, and by the bias current required by it. Suitable values for the resistors R1, R2, and R3 for other type regulator circuits could be determined by those skilled in the art.

It will be understood that part of the AC secondary voltage produced by the secondary winding 16 of the transformer 12 may be obtained between one of the rectifier input terminals 24, 26 (which correspond to the secondary winding end terminals 20, 22), and ground. In the present case, part of the diode bridge of rectifier CR1 (D3 and D4) couples the lower potential secondary winding end terminal to ground potential at rectifier output terminal 30. According to the invention, one of the secondary winding end terminals, e.g., terminal 22, is connected to another rectifier circuit comprising diodes D6 and D7 and filter capacitor 40 through a DC blocking capacitor 42, as shown in FIG. 1. Both capacitors 40, 42 may have typical values of, e.g., 470 uF.

The diodes D6, D7 and capacitor 40 are arranged in a voltage multiplier configuration, specifically, a voltage doubler circuit, so as to produce a desired negative DC potential between one terminal of the filter capacitor 40 and the other terminal of capacitor 40 which is at ground potential, in the present supply 10. That is, diodes D6, D7 are connected in series across capacitor 40, with the anode of diode D6 being connected to the ungrounded terminal of capacitor 40 and the cathode of diode D7 being connected to the grounded terminal of capacitor 40. The blocking capacitor 42 has one terminal connected to the connection point between diodes D6, D7, and the other terminal of capacitor 42 is connected to the secondary winding end terminal 22.

The particular values of capacitors 40 and 42 are in fact determined by the load current requirement and are approximately proportional to it.

The negative potential developed across capacitor 40 is applied to the input of DC regulator circuit 44 (e.g., device type MC79L12), the output of which is connected to one terminal of filter capacitor 46 (e.g., 4.7 uF). The other terminal of capacitor 46 is grounded. Accordingly, a regulated negative DC voltage supply is obtained at the output of regulator circuit 44, this supply being of a polarity opposite to that which was obtained from the regulator circuit 34 associated with rectifier CR1 which, in turn, is connected across the entire secondary winding 16 of the transformer 12.

In order that a complimentary, positive DC supply potential be provided with respect to the negative DC supply potential obtained from the regulator circuit 44, according to the invention, the center-tap terminal 18 is connected through a diode D8 to one terminal of a DC filter capacitor 48, the other terminal of capacitor 48 being connected to ground. A positive potential is thus produced at the ungrounded terminal of capacitor 48 with respect to ground. The ungrounded (or positive) terminal of capacitor 48 is connected to the input of a DC regulator circuit 50 which may be, for example, device type MC78L12.

The referrence terminal of regulator circuit 50 is grounded, and the output of the regulator circuit 50 is connected to one terminal of a filter capacitor 52 (e.g., 4.7 uF), the other terminal of capacitor 52 being grounded. With the foregoing arrangement, a balanced DC voltage supply of plus and minus 12 volts can be obtained from the outputs of regulator circuits 50, 44, respectively.

A further DC supply voltage of a magnitude different from those produced thus far, is obtained by connecting the input of another DC regulator circuit 54 to the side of the diode D8 which is connected to the input of regulator circuit 50, the regulator circuit 54 being of a different type (e.g., device type MC7805) than the regulator circuit 50. A DC input capacitor 56 (2400 uF) is connected between the input of the regulator circuit 54 and ground, the reference terminal of regulator circuit 54 also being grounded. Further, the output of regulator circuit 54 is connected to one terminal of filter capacitor 58 (10 uF), the other terminal of capacitor 58 being grounded. Using components of the foregoing exemplary values, a regulated +5 volt DC voltage is obtained from regulator circuit 54.

While specific embodiments of the invention have been shown and described in detail to illustrate the application of the inventive principles, it will be understood that the invention may be embodied otherwise without departing from such principles. In particular, the specific component values set out herein are not intended to be limitative, and other values can be arrived at by those skilled in the art so as to obtain certain desired operating parameters. Further, various ones of the specific components may themselves be replaced by equivalent components or circuits while obtaining similar results.

I claim:

1. A DC power supply arrangement comprising:
   a transformer including primary winding means for connection to an AC voltage source, and secondary winding means in electromagnetic coupling relation with said primary winding means;
   first and second secondary winding terminal means connected across at least a portion of said secondary winding means for providing an AC secondary voltage when said primary winding means is connected to the AC voltage source;
   center tap terminal means connected to a winding center point of said secondary winding means relative to the connection points of said first and said second terminal means;
   first rectifier means having a pair of input terminals connected to said first and said second secondary winding terminal means, and a pair of output terminals one of which is coupled to a common potential point, for producing at the other one of said output terminals a first DC voltage of one polarity with respect to said common potential point in response to the AC voltage provided by said secondary winding terminal means, said first rectifier means including a first diode circuit arranged so that one of said secondary winding terminal means is coupled through a part of said first diode circuit to said common potential point during a half cycle period;
   second rectifier means including DC blocking means connected to a selected one of said secondary winding terminal means, for producing a second DC voltage of polarity opposite to that produced by the first rectifier means with respect to said common potential point; and
   third rectifier means including a diode one terminal of which is connected to said center tap terminal means of said secondary winding means, for producing a third DC voltage of polarity opposite to that produced by said second rectifier means.

2. The power supply according to claim 1 wherein said DC blocking means includes a first capacitor one terminal of which is connected to the selected one of said first and said second terminal means of said secondary winding means, for blocking said second DC voltage produced by said second rectifier means from the selected terminal means.

3. The power supply according to claim 2, wherein said second rectifier means includes voltage multiplier means connected between the remaining terminal of said first capacitor and said common potential point, said voltage multiplier means comprising a second capacitor and diodes connected across said second capacitor so that said second DC voltage is developed across said second capacitor.

4. The power supply according to claim 1, wherein said third rectifier means includes a capacitor connected between the remaining terminal of said diode and said common potential point so that said third DC voltage is developed across said capacitor.

5. The power supply according to claim 3, wherein said third rectifier means includes a third capacitor connected between the remaining terminal of said diode and said common potential point so that said third DC voltage is developed across said third capacitor, said second and said third capacitor having values selected so that said second DC voltage is substantially equal to but of opposite polarity from said third DC voltage.

6. The power supply according to claim 4, including fourth rectifier means part of which is formed by said diode of said third rectifier means, for producing a DC voltage of the same polarity but of a value different from said first DC voltage.

7. The power supply according to claim 5, wherein said second and said third rectifier means each include regulator means for regulating said second and said third DC voltages at substantially constant levels under load conditions.

* * * * *